(12) United States Patent
Merriman et al.

(10) Patent No.: US 9,647,292 B2
(45) Date of Patent: May 9, 2017

(54) BATTERY CELL ASSEMBLY AND METHOD FOR MANUFACTURING A COOLING FIN FOR THE BATTERY CELL ASSEMBLY

(71) Applicant: LG Chem, Ltd., Seoul (KR)

(72) Inventors: Robert Merriman, Shelby Township, MI (US); Satish Ketkar, Troy, MI (US); Michael Nielson, Royal Oak, MI (US); Igor Isayev, Farmington Hills, MI (US)

(73) Assignee: LG Chem, Ltd., Seoul (KR)

( * ) Notice: Subject to any disclaimer, the term of this patent is extended or adjusted under 35 U.S.C. 154(b) by 738 days.

(21) Appl. No.: 13/861,426

(22) Filed: Apr. 12, 2013

(65) Prior Publication Data
US 2014/0308558 A1    Oct. 16, 2014

(51) Int. Cl.
*H01M 10/50* (2006.01)
*H01M 10/04* (2006.01)
(Continued)

(52) U.S. Cl.
CPC ..... *H01M 10/0481* (2013.01); *H01M 10/613* (2015.04); *H01M 10/647* (2015.04); *H01M 10/6551* (2015.04); *H01M 10/6555* (2015.04); *H01M 10/6556* (2015.04); *F28F 1/20* (2013.01); *F28F 21/02* (2013.01); *H01M 10/0486* (2013.01); *Y10T 29/49108* (2015.01)

(58) Field of Classification Search
CPC ............. H01M 10/613; H01M 10/647; H01M 10/6551; H01M 10/6555; H01M 10/6556
See application file for complete search history.

(56) References Cited

U.S. PATENT DOCUMENTS

| 2,273,244 A | 2/1942 | Cornelius |
| 2,391,859 A | 1/1946 | Earl |

(Continued)

FOREIGN PATENT DOCUMENTS

| EP | 1577966 A | 9/2005 |
| EP | 1852925 A | 11/2007 |

(Continued)

OTHER PUBLICATIONS

"Gasket". Merriam-Webster. Merriam-Webster. Web. May 30, 2012. <http://www.merriam-webster.com/dictionary/gasket>.

(Continued)

*Primary Examiner* — Nicholas P D'Aniello
*Assistant Examiner* — Jimmy K Vo
(74) *Attorney, Agent, or Firm* — Buckert Patent & Trademark Law Firm PC; John F. Buckert

(57) ABSTRACT

A battery cell assembly having a cooling fin with a tube and a flexible thermally conductive sheet disposed on the tube is provided. The tube has first, second, and third tube portions. The sheet has first, second, and third sheet portions. The first and second sheet portions are disposed on at least the first and second tube portions, respectively, and the third sheet portion extends between the first and second tube portions. The assembly further includes a first clamping member clamping the first sheet portion to the first tube portion, and a second clamping member clamping the second sheet portion to the second tube portion. The assembly further includes a battery cell disposed against the third sheet portion.

14 Claims, 7 Drawing Sheets

(51) Int. Cl.
  *H01M 10/6551* (2014.01)
  *H01M 10/647* (2014.01)
  *H01M 10/6556* (2014.01)
  *H01M 10/6555* (2014.01)
  *H01M 10/613* (2014.01)
  *F28F 21/02* (2006.01)
  *F28F 1/20* (2006.01)

(56) References Cited

U.S. PATENT DOCUMENTS

| | | | |
|---|---|---|---|
| 3,503,558 A | 3/1970 | Galiulo et al. | |
| 3,522,100 A | 7/1970 | Lindstrom | |
| 3,550,681 A | 12/1970 | Stier et al. | |
| 3,964,930 A | 6/1976 | Reiser | |
| 4,009,752 A | 3/1977 | Wilson | |
| 4,063,590 A | 12/1977 | Mcconnell | |
| 4,298,904 A | 11/1981 | Koenig | |
| 4,322,776 A | 3/1982 | Job et al. | |
| 4,444,994 A | 4/1984 | Baker et al. | |
| 4,518,663 A | 5/1985 | Kodali et al. | |
| 4,646,202 A | 2/1987 | Hook et al. | |
| 4,701,829 A | 10/1987 | Bricaud et al. | |
| 4,777,561 A | 10/1988 | Murphy et al. | |
| 4,849,858 A | 7/1989 | Grapes et al. | |
| 4,995,240 A | 2/1991 | Barthel et al. | |
| 5,057,968 A | 10/1991 | Morrison | |
| 5,071,652 A | 12/1991 | Jones et al. | |
| 5,214,564 A | 5/1993 | Metzler et al. | |
| 5,270,131 A | 12/1993 | Diethelm et al. | |
| 5,322,745 A | 6/1994 | Yanagihara et al. | |
| 5,329,988 A | 7/1994 | Juger | |
| 5,346,786 A | 9/1994 | Hodgetts | |
| 5,356,735 A | 10/1994 | Meadows et al. | |
| 5,510,203 A | 4/1996 | Hamada et al. | |
| 5,520,976 A | 5/1996 | Giannetti et al. | |
| 5,663,007 A | 9/1997 | Ikoma et al. | |
| 5,736,836 A | 4/1998 | Hasegawa et al. | |
| 5,756,227 A | 5/1998 | Suzuki et al. | |
| 5,937,664 A | 8/1999 | Matsuno et al. | |
| 6,087,036 A | 7/2000 | Rouillard et al. | |
| 6,111,387 A | 8/2000 | Kouzu et al. | |
| 6,176,095 B1 | 1/2001 | Porter | |
| 6,344,728 B1 | 2/2002 | Kouzu et al. | |
| 6,399,238 B1 | 6/2002 | Oweis et al. | |
| 6,462,949 B1 | 10/2002 | Parish, IV et al. | |
| 6,512,347 B1 | 1/2003 | Hellmann et al. | |
| 6,569,556 B2 | 5/2003 | Zhou et al. | |
| 6,662,891 B2 | 12/2003 | Misu et al. | |
| 6,689,510 B1 | 2/2004 | Gow et al. | |
| 6,696,197 B2 | 2/2004 | Inagaki et al. | |
| 6,703,160 B2 * | 3/2004 | Gao | H01M 2/1077 429/100 |
| 6,750,630 B2 | 6/2004 | Inoue et al. | |
| 6,775,998 B2 | 8/2004 | Yuasa et al. | |
| 6,780,538 B2 | 8/2004 | Hamada et al. | |
| 6,821,671 B2 | 11/2004 | Hinton et al. | |
| 6,826,948 B1 | 12/2004 | Bhatti et al. | |
| 6,878,485 B2 | 4/2005 | Ovshinsky et al. | |
| 6,982,131 B1 | 1/2006 | Hamada et al. | |
| 7,070,874 B2 | 7/2006 | Blanchet et al. | |
| 7,143,124 B2 | 11/2006 | Garthwaite | |
| 7,150,935 B2 | 12/2006 | Hamada et al. | |
| 7,264,902 B2 | 9/2007 | Horie et al. | |
| 7,278,389 B2 | 10/2007 | Kirakosyan | |
| 7,467,525 B1 | 12/2008 | Ohta et al. | |
| 7,531,270 B2 | 5/2009 | Buck et al. | |
| 7,795,845 B2 | 9/2010 | Cho | |
| 7,797,958 B2 | 9/2010 | Alston et al. | |
| 7,816,029 B2 | 10/2010 | Takamatsu et al. | |
| 7,846,573 B2 | 12/2010 | Kelly | |
| 7,879,480 B2 | 2/2011 | Yoon et al. | |
| 7,883,793 B2 | 2/2011 | Niedzwiecki et al. | |
| 7,976,978 B2 | 7/2011 | Shin et al. | |
| 7,981,538 B2 | 7/2011 | Kim et al. | |
| 7,997,367 B2 | 8/2011 | Nakamura | |
| 8,007,915 B2 | 8/2011 | Kurachi | |
| 8,030,886 B2 | 10/2011 | Mahalingam et al. | |
| 8,067,111 B2 | 11/2011 | Koetting et al. | |
| 8,209,991 B2 | 7/2012 | Kondou et al. | |
| 2002/0182493 A1 | 12/2002 | Ovshinsky et al. | |
| 2003/0211384 A1 | 11/2003 | Hamada et al. | |
| 2004/0069474 A1 | 4/2004 | Wu et al. | |
| 2005/0026014 A1 | 2/2005 | Fogaing et al. | |
| 2005/0089750 A1 | 4/2005 | Ng et al. | |
| 2005/0103486 A1 | 5/2005 | Demuth et al. | |
| 2005/0110460 A1 | 5/2005 | Arai et al. | |
| 2005/0134038 A1 | 6/2005 | Walsh | |
| 2006/0234119 A1 | 10/2006 | Kruger et al. | |
| 2006/0286450 A1 | 12/2006 | Yoon et al. | |
| 2007/0087266 A1 | 4/2007 | Bourke et al. | |
| 2008/0003491 A1 | 1/2008 | Yahnker et al. | |
| 2008/0041079 A1 | 2/2008 | Nishijima et al. | |
| 2008/0182151 A1 | 7/2008 | Mizusaki et al. | |
| 2008/0248338 A1 | 10/2008 | Yano et al. | |
| 2009/0087727 A1 | 4/2009 | Harada et al. | |
| 2009/0104512 A1 | 4/2009 | Fassnacht et al. | |
| 2009/0155680 A1 | 6/2009 | Maguire et al. | |
| 2009/0186265 A1 | 7/2009 | Koetting et al. | |
| 2009/0258288 A1 | 10/2009 | Weber et al. | |
| 2009/0280395 A1 | 11/2009 | Nemesh et al. | |
| 2009/0325051 A1 | 12/2009 | Niedzwiecki et al. | |
| 2009/0325052 A1 | 12/2009 | Koetting et al. | |
| 2009/0325054 A1 | 12/2009 | Payne et al. | |
| 2009/0325055 A1 | 12/2009 | Koetting et al. | |
| 2010/0112419 A1 | 5/2010 | Jang et al. | |
| 2010/0203376 A1 | 8/2010 | Choi et al. | |
| 2010/0209760 A1 | 8/2010 | Yoshihara et al. | |
| 2010/0262791 A1 | 10/2010 | Gilton | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279154 A1 | 11/2010 | Koetting et al. | |
| 2011/0027640 A1 | 2/2011 | Gadawski et al. | |
| 2011/0041525 A1 | 2/2011 | Kim et al. | |
| 2011/0052959 A1 | 3/2011 | Koetting et al. | |
| 2012/0082880 A1 | 4/2012 | Koetting et al. | |
| 2013/0045410 A1 * | 2/2013 | Yang | H01M 10/625 429/120 |

FOREIGN PATENT DOCUMENTS

| | | |
|---|---|---|
| JP | 08111244 | 4/1996 |
| JP | 09129213 | 5/1997 |
| JP | 09219213 | 8/1997 |
| JP | 2001105843 A | 4/2001 |
| JP | 2002038033 A | 2/2002 |
| JP | 2002319383 A | 10/2002 |
| JP | 2003188323 A | 7/2003 |
| JP | 2005126315 A | 5/2005 |
| JP | 2005349955 A | 12/2005 |
| JP | 2006139928 A | 6/2006 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| WO | 2006101343 A | 9/2006 |

(56) References Cited

FOREIGN PATENT DOCUMENTS

| WO | 2007007503 A | 1/2007 | | |
|---|---|---|---|---|
| WO | 2007115743 A2 | 10/2007 | | |
| WO | 2008111162 A | 9/2008 | | |
| WO | 2009073225 A | 6/2009 | | |
| WO | WO 2011146919 A2 * | 11/2011 | ........ | H01M 10/5044 |

OTHER PUBLICATIONS

International Search Report; International Application No. PCT/KR2009/000258; International Filing Date: Jan. 16, 2009; Date of Mailing: Aug. 28, 2009; 2 pages.

International Search Report; International Application No. PCT/KR2009/003428, International Filing Date: Jun. 25, 2009; Date of Mailing: Jan. 22, 2010; 2 pages.

International Search Report; International Application No. PCT/KR2009/003429; International Filing Date: Jun. 25, 2009; Date of Mailing: Jan. 12, 2010; 3 pages.

International Search Report; International Application No. PCT/KR2009/003430; International Filing Date: Jun. 25, 2009; Date of Mailing: Feb. 3, 2010; 2 pages.

International Search Report; International Application No. PCT/KR2009/003434; International Filing Date: Jun. 25, 2009; Date of Mailing: Jan. 18, 2010; 2 pages.

International Search Report; International Application No. PCT/KR2009/003436; International Filing Date: Jun. 25, 2009; Date of Mailing: Jan. 22, 2010; 2 pages.

International Search Report; International Application No. PCT/KR2009/006121; International Filing Date: Oct. 22, 2009; Date of Mailing: May 3, 2010; 2 pages.

International Search Report; International Application No. PCT/KR2010/002334; International Filing Date: Apr. 15, 2010; Date of Mailing: Nov. 29, 2010; 2 pages.

International Search Report; International Application No. PCT/KR2010/002336; International Filing Date: Apr. 15, 2010; Date of Mailing: Jan. 31, 2011; 2 pages.

International Search Report; International Application No. PCT/KR2010/002337; International Filing Date: Apr. 15, 2010; Date of Mailing: May 3, 2010; 2 pages.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

Thomas J. Gadawski et al., pending U.S. Appl. No. 13/433,649 entitled "Battery System and Method for Cooling the Battery System," filed Mar. 29, 2012.

U.S. Appl. No. 13/475,963, filed May 19, 2012 entitled Battery Cell Assembly and Method for Manufacturing a Cooling Fin for the Battery Cell Assembly.

U.S. Appl. No. 13/586,960, filed Aug. 16, 2012 entitled Battery Module.

U.S. Appl. No. 13/587,030, filed Aug. 16, 2012 entitled Battery Module and Method for Assembling the Battery Module.

U.S. Appl. No. 13/766,162, filed Feb. 13, 2013 entitled Battery Cell Assembly and Method for Manufacturing the Battery Cell Assembly.

U.S. Appl. No. 13/686,018, filed Nov. 27, 2012 entitled Battery System and Method for Cooling a Battery Cell Assembly.

* cited by examiner

BATTERY CELL ASSEMBLY AND METHOD FOR MANUFACTURING A COOLING FIN FOR THE BATTERY CELL ASSEMBLY

BACKGROUND

A metal cooling plate has been disposed against a battery cell to cool the battery cell. However, the inventors have recognized that a side of the metal cooling plate may have an abrasive residue formed thereon which can undesirably rub against an adjacent battery cell.

Accordingly, the inventors herein have recognized a need for an improved battery cell assembly and a method for manufacturing a cooling fin in the battery cell assembly that minimizes and/or eliminates the above-mentioned deficiency.

SUMMARY

A battery cell assembly in accordance with an exemplary embodiment is provided. The battery cell assembly includes a cooling fin having a tube and a flexible thermally conductive sheet disposed on the tube. The tube has first, second, and third tube portions fluidly communicating with one another. The first and second tube portions are substantially parallel to one another. The third tube portion is substantially perpendicular to the first and second tube portions and extends between the first and second tube portions. The flexible thermally conductive sheet has first, second, and third sheet portions. The first and second sheet portions are disposed on at least the first and second tube portions, respectively, and the third sheet portion extends between the first and second tube portions. The battery cell assembly further includes a first clamping member configured to clamp the first sheet portion of the flexible thermally conductive sheet to the first tube portion. The battery cell assembly further includes a second clamping member configured to clamp the second sheet portion of the flexible thermally conductive sheet to the second tube portion. The battery cell assembly further includes a battery cell disposed against the third sheet portion of the flexible thermally conductive sheet.

A method for manufacturing a cooling fin of a battery cell assembly in accordance with another exemplary embodiment is provided. The method includes providing a cooling fin having a tube. The tube has first, second, and third tube portions fluidly communicating with one another. The first and second tube portions are substantially parallel to one another. The third tube portion is substantially perpendicular to the first and second tube portions and extends between the first and second tube portions. The method further includes providing a flexible thermally conductive sheet having first, second, and third sheet portions. The method further includes disposing the first and second sheet portions of the flexible thermally conductive sheet on at least the first and second tube portions, respectively, such that the third sheet portion extends between the first and second tube portions. The method further includes clamping the first sheet portion of the flexible thermally conductive sheet to the first tube portion utilizing a first clamping member. The method further includes clamping the second sheet portion of the flexible thermally conductive sheet to the second tube portion utilizing a second clamping member. The method further includes disposing a battery cell against the third sheet portion of the flexible thermally conductive sheet.

DETAILED DESCRIPTION

Figure 1:
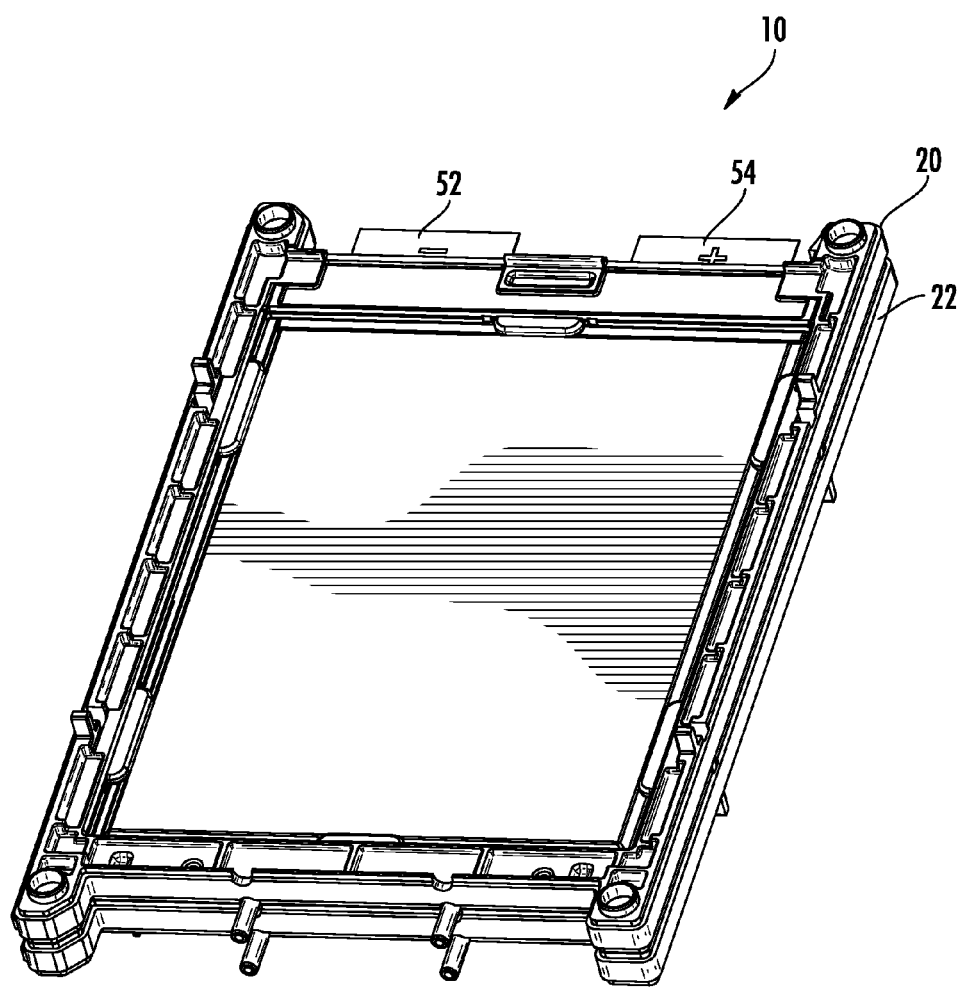
FIG. 1 is a schematic of a battery cell assembly in accordance with an exemplary embodiment.
Figure 2:
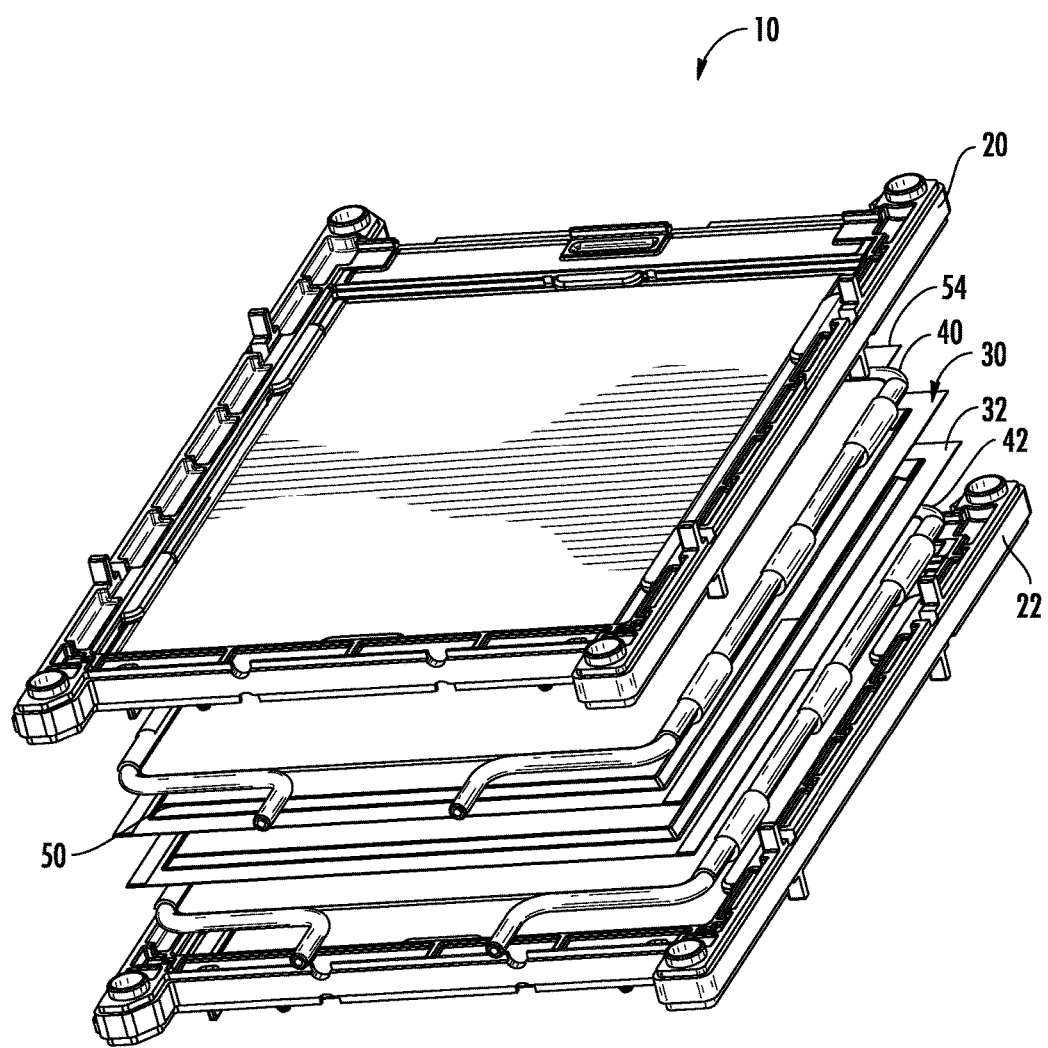
FIG. 2 is an exploded view of the battery cell assembly of FIG. 1.
Figure 3:
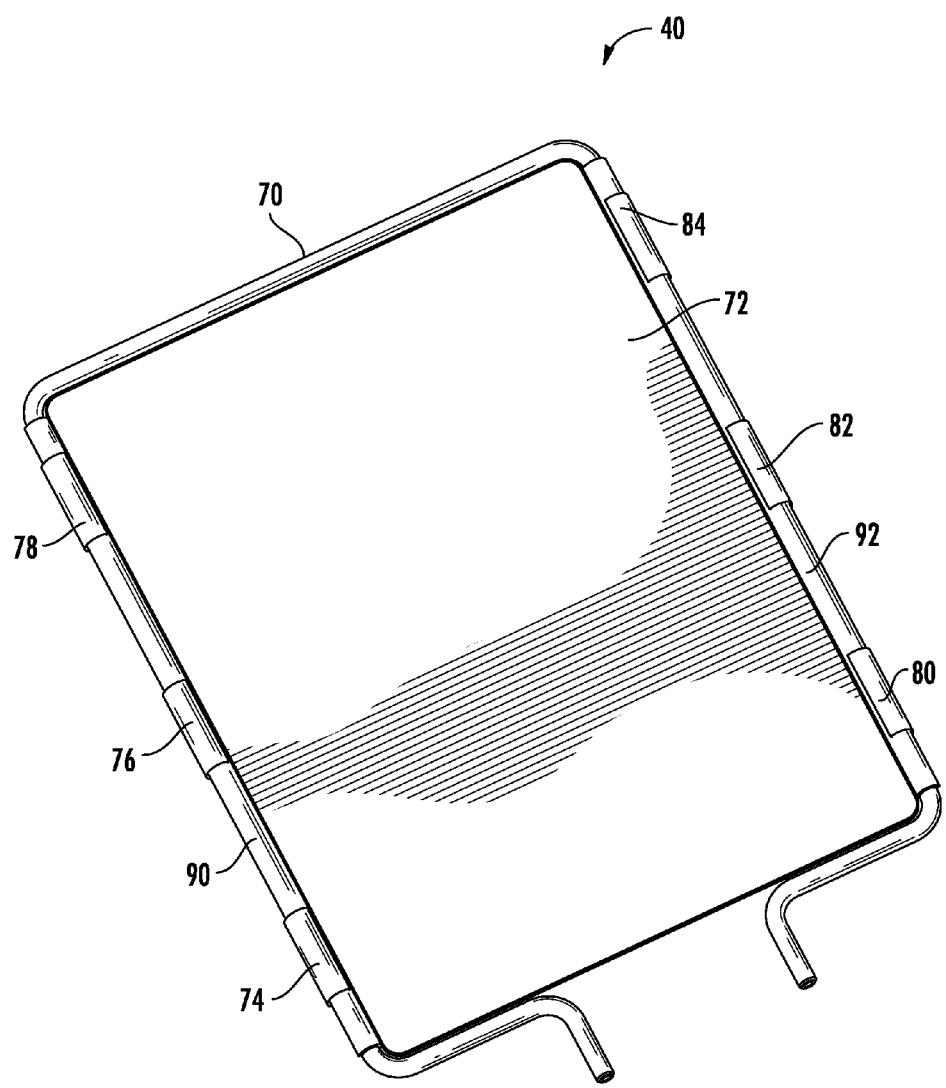
FIG. 3 is a schematic of a cooling fin utilized in the battery cell assembly of FIG. 1.

Referring to FIGS. 1-3, a battery cell assembly 10 in accordance with an exemplary embodiment is provided. The battery cell assembly 10 includes rectangular ring-shaped frame members 20, 22, battery cells 30, 32, and cooling fins 40, 42. An advantage of the battery cell assembly 10 is that the assembly 10 utilizes the cooling fin 40 having a flexible thermally conductive sheet 72 which is easily manufactured and has excellent thermal characteristics for conducting heat energy from the battery cells to a tube 70 of the cooling fin 40.

The rectangular ring-shaped frame members 20, 22 are configured to be coupled together to hold the battery cells 30, 32 and the cooling fins 40, 42 therebetween. In one exemplary embodiment, the rectangular ring-shaped frame members 20, 22 are constructed of plastic. However, in alternative embodiments, the rectangular ring-shaped frame members 20, 22 could be constructed of other materials known to those skilled in the art.

The battery cells 30, 32 are each configured to generate an operational voltage. In one exemplary embodiment, each of the battery cells 30, 32 are pouch-type lithium-ion battery cells having a substantially rectangular peripheral profile. Of course, other types of battery cells known to those skilled in the art could be utilized. Also, in an exemplary embodiment, the battery cells 30, 32 are electrically coupled in series to one another.

The battery cell 30 includes a rectangular-shaped pouch 50 and electrodes 52, 54 extending from the pouch 50. The battery cell 30 is disposed between the battery cell 32 and the cooling fin 40.

The battery cell 32 has an identical structure as the battery cell 30. The battery cell 32 is disposed between the battery cell 30 and the cooling fin 42.

Referring to FIGS. 2-6, the cooling fin 40 is disposed between the rectangular ring-shaped member 20 and the battery cell 30 and is configured to transfer heat energy from the battery cell 30 to a refrigerant or a liquid flowing through the cooling fin 40 to cool the battery cell 30. The cooling fin 40 includes a tube 70, a flexible thermally conductive sheet 72, and clamping members 74, 76, 78, 80, 82, 84.

Figure 5:
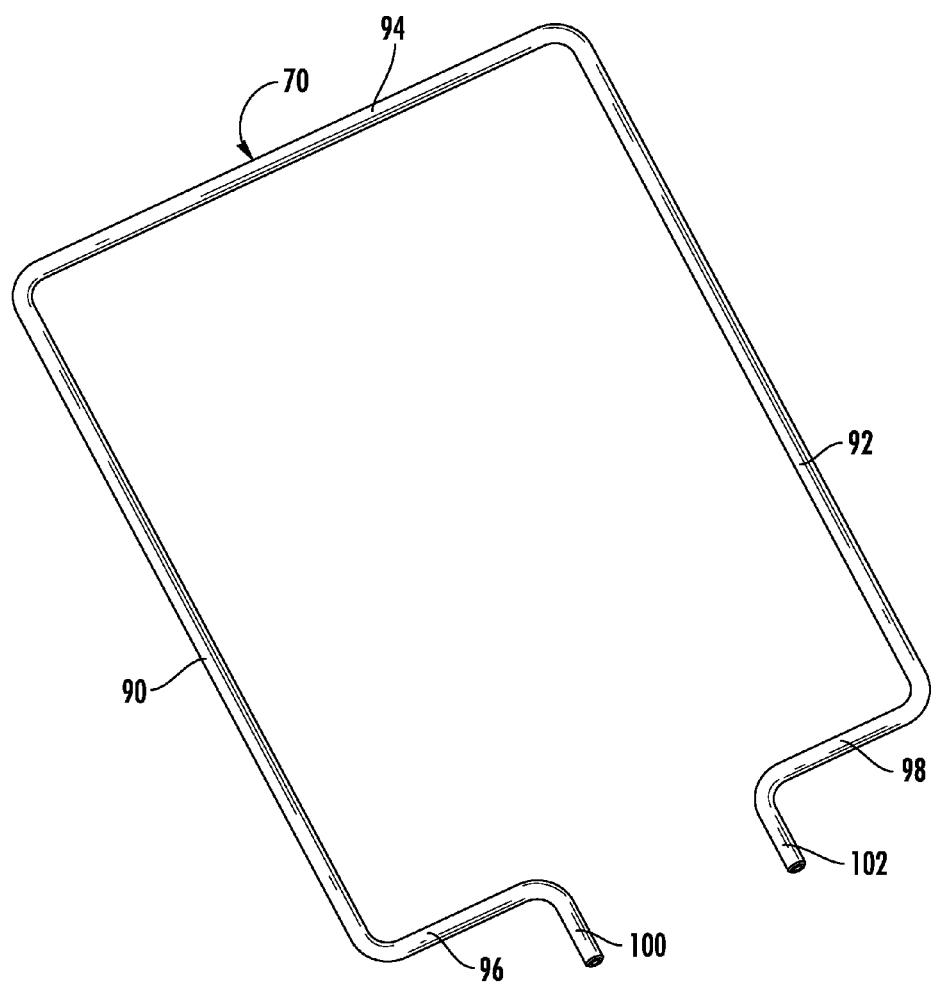
FIG. 5 is a schematic of a tube utilized in the cooling fin of FIG. 3.

Referring to FIG. 5, the tube 70 is configured to transfer at least a portion of the heat energy from the battery cell 30 to a liquid or a refrigerant flowing through the tube 70. The tube 70 includes a first tube portion 90, a second tube portion 92, a third tube portion 94, a fourth tube portion 96, a fifth tube portion 98, the sixth tube portion 100, and a seventh tube portion 102 that fluidly communicate with one another. The first and second tube portions and 90, 92 are substantially parallel to one another. The third tube portion 94 is substantially perpendicular to the first and second tube portions 90, 92 and extends between the first and second tube portions 90, 92. The fourth and fifth tube portions 96, 98 extend from the first and second tube portions 90, 92, respectively, and are substantially perpendicular to the first and second tube portions 90, 92, respectively. The sixth and seventh tube portions 100, 102 extend from the fourth and fifth tube portions 96, 98, respectively, and are substantially perpendicular to the fourth and fifth tube portions 96, 98, respectively. In one exemplary embodiment, the tube 70 is constructed of aluminum. However, the tube 70 could be constructed of other materials known to those skilled in the art.

Figure 6:
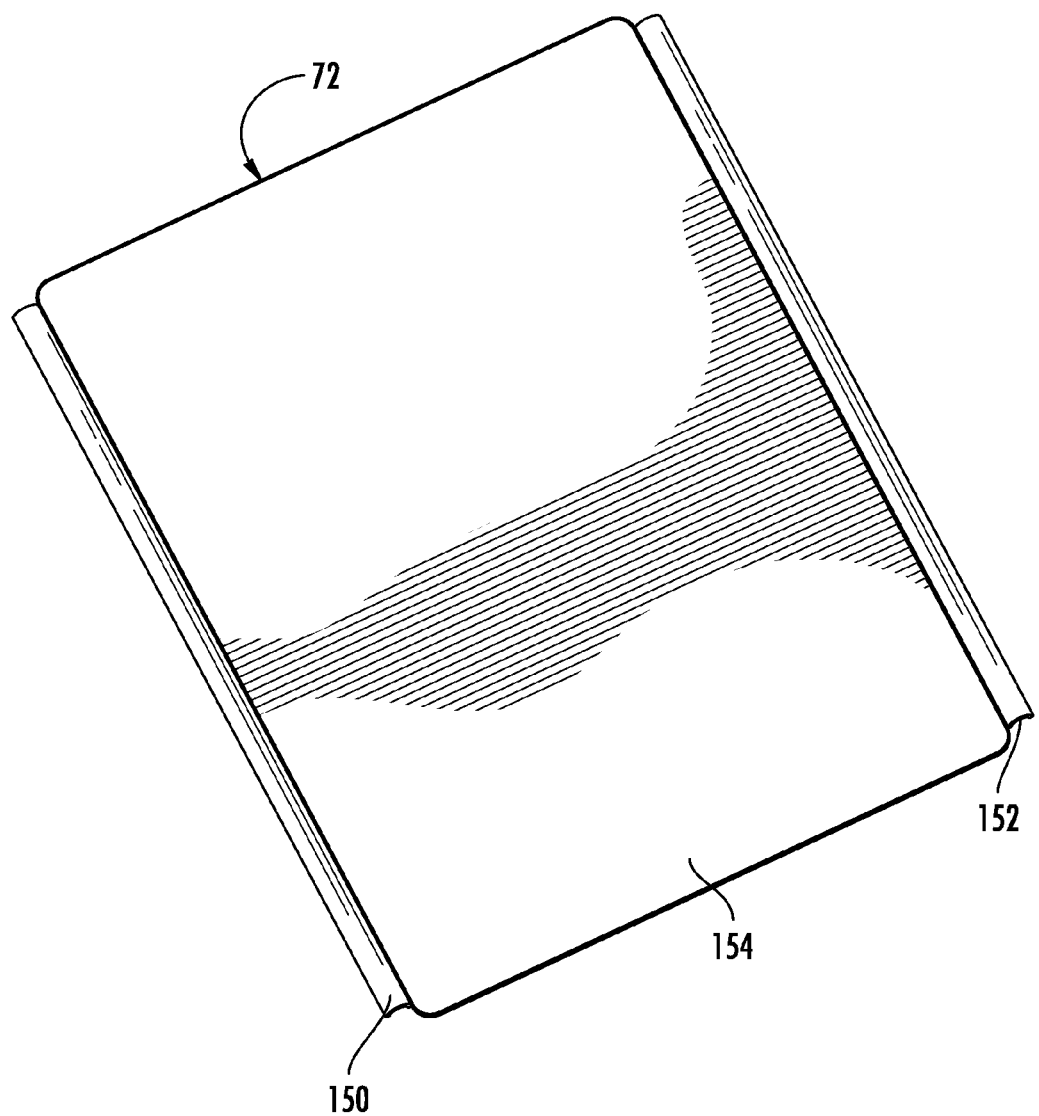
FIG. 6 is a schematic of a flexible thermally conductive sheet utilized in the cooling fin of FIG. 3.
Figure 7:
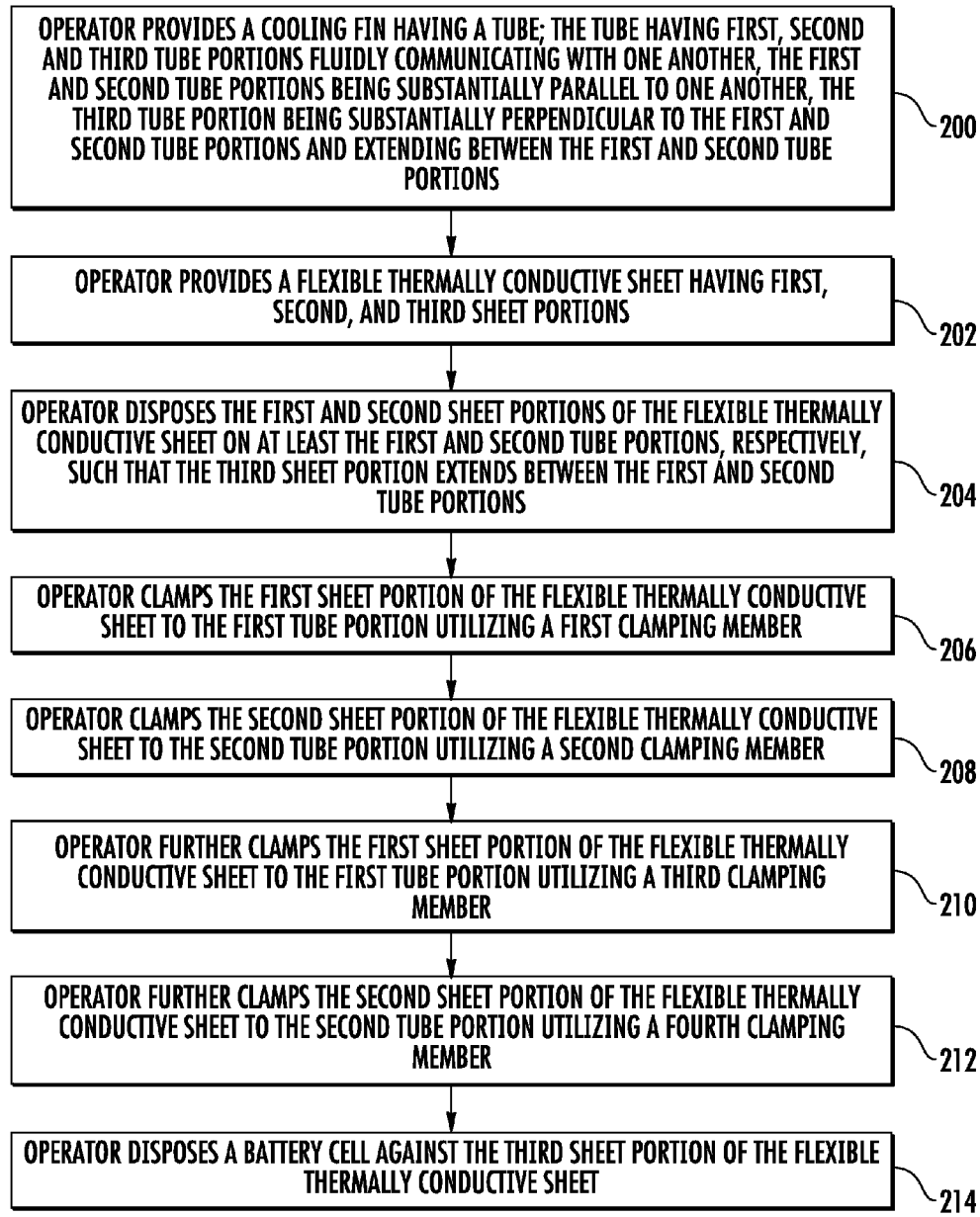
FIG. 7 is a flowchart of a method for manufacturing the cooling fin of FIG. 3 in accordance with another exemplary embodiment.

Referring to FIGS. 3 and 6, the flexible thermally conductive sheet 72 is configured to transfer heat energy from the battery cell 30 to the tube 70. The flexible thermally conductive sheet 72 includes a first sheet portion 150, a second sheet portion 152, and a third sheet portion 154. As shown, the first and second sheet portions 150, 152 are coupled to opposite sides of the third sheet portion 154 and extend substantially parallel to one another.

In one exemplary embodiment, the flexible thermally conductive sheet 72 is constructed at least in part utilizing graphite having a thickness in a range of 0.25-0.5 millimeters. Further, the sheet 72 has an in-plane heat conductivity of greater than 200 Watts/meter—Kelvin. Also, in one exemplary embodiment, a side of the flexible thermally conductive sheet 72 contacting the battery cell 30 has a roughness average (RA) in a range of 0.8-4.0 micro inches. Of course, in an alternative embodiment, the flexible thermally conductive sheet 72 could have an RA less than 0.8 or greater than 4.0. Of course, in alternative embodiments, the flexible thermally conductive sheet 72 could have other shapes and sizes known to those skilled in the art. The flexible thermally conductive sheet 72 is configured to transfer heat energy from the battery cell 30 to the tube 70. In particular, for example, the flexible thermally conductive sheet 72 could comprise "Spreadershield SS-400" manufactured by GrafTech International Holdings Inc.

Figure 4:
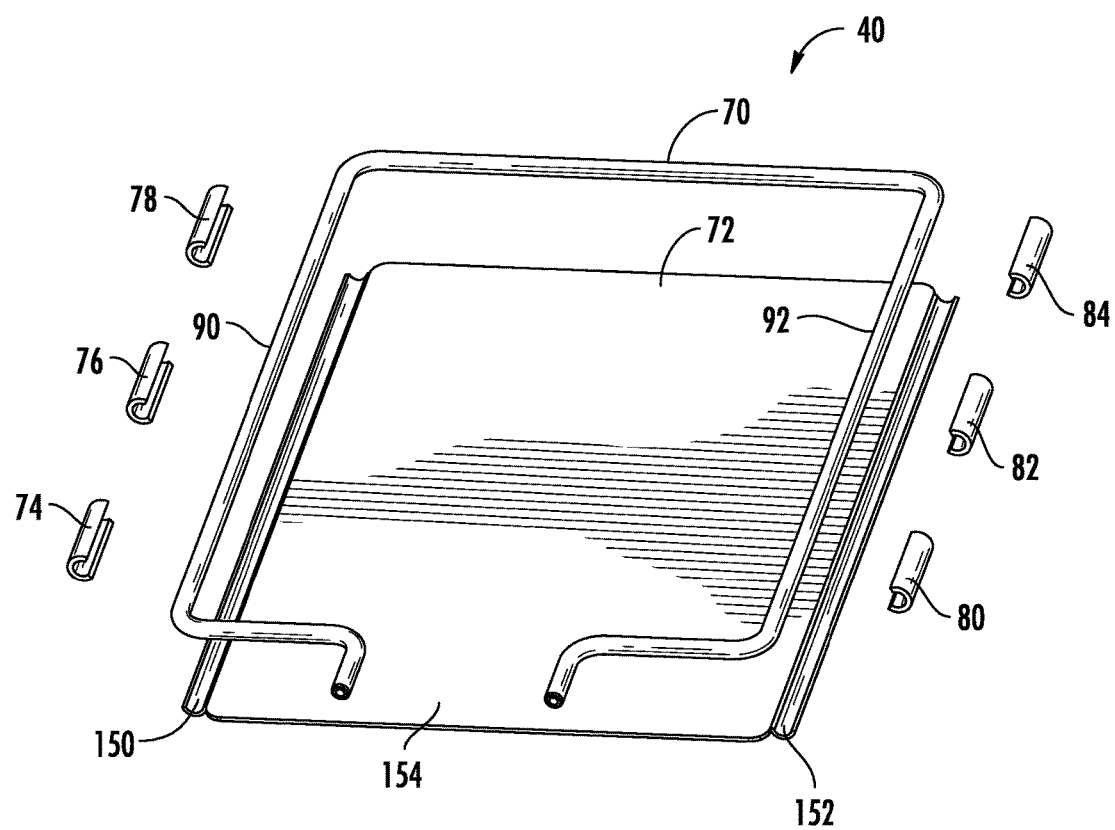
FIG. 4 is an exploded view of the cooling fin of FIG. 3.

Referring to FIGS. 3 and 4, the clamping members 74, 76, 78 are configured to configured to clamp the first sheet portion 150 of the flexible thermally conductive sheet 72 to the first tube portion 90 of the tube 70 after the first sheet portion 150 is disposed on the first tube portion 90. Similarly, the clamping members 80, 82, 84 are configured to clamp the second sheet portion 152 of the flexible thermally conductive sheet 72 to the second tube portion 92 of the tube 70 after the second sheet portion 152 is disposed on the second tube portion 92. In one exemplary embodiment, the clamping members 74-84 are constructed of plastic. Of course, in alternative embodiments, the clamping members 74-84 could be constructed of other materials such as steel or aluminum for example. An advantage of the clamping members 74-84 is that the clamping members 74-84 allow an operator to quickly and effectively couple the flexible thermally conductive sheet 72 to the tube 70. In an exemplary embodiment, six clamping members utilized to clamp the first sheet portion 150 of the flexible thermally conductive sheet 72 to the first tube portion 90 of the tube 70. However, in an alternative embodiment, the number of clamping members and the position of the clamping members can be changed as long as the flexible thermally conductive sheet 72 is sufficiently coupled to the tube 70. For example, the number of clamping members could be less than six or greater than six.

In one exemplary embodiment, a structure of each of the clamping members 74-84 is identical to one another. Accordingly, only the structure of the clamping member 74 will be described in greater detail below. In one exemplary embodiment, the clamping member 74 has a C-shaped cross-sectional profile. Further, a diameter of the C-shaped cross-sectional profile is substantially equal to a diameter of the tube 70. Also, a longitudinal length of the clamping member 74 is less than one-fifth of a length of the first tube portion 90.

Referring to FIGS. 2 and 6, the third sheet portion 154 extends between the first sheet portion 150 and the second sheet portion 152 and is sized to be disposed against a generally rectangular-shaped side surface of the battery cell 30 and to cover substantially the entire generally rectangular-shaped side surface of the battery cell 30.

Referring to FIG. 2, the cooling fin 42 has an identical structure as the structure of the cooling fin 40. The cooling fin 42 is disposed on the rectangular ring-shaped frame member 22 and against the battery cell 32 and extracts heat energy from the battery cell 32 to a refrigerant or a liquid flowing through the cooling fin 42 to cool the battery cell 32.

Referring to FIGS. 2, 3 and 5, during operation, a refrigerant or a liquid enters the sixth tube portion 100 from a source device (not shown) and flows through the fourth tube portion 96, the first tube portion 90, the third tube portion 94, the second tube portion 92, the fifth tube portion 98, and the seventh tube portion 102 and exits the seventh tube portion 102 to a receiving device. Heat energy generated by the battery cell 30 is conducted through the flexible thermally conductive sheet 72 to the tube 70. Further, heat energy generated by the battery cell 32 is conducted through a flexible thermally conductive sheet of the cooling fin 42 to a tube of the cooling fin 42. Further, the heat energy in the tube of the cooling fin 42 is conducted into the refrigerant or the liquid flowing through the respective tube. Thus, the refrigerant or the liquid flowing through the tube 70 and the tube of the cooling fin 42 absorb the heat energy from the battery cells 30, 32 to reduce a temperature of the battery cells 30, 32.

Referring to FIGS. 2-7, a flowchart of a method for manufacturing the cooling fin 40 in accordance with another exemplary embodiment will now be explained.

At step 200, an operator provides the cooling fin 40 having the tube 70. The tube 70 has first, second, and third tube portions 90, 92, 94 fluidly communicating with one another. The first and second tube portions 90, 92 are substantially parallel to one another. The third tube portion 94 is substantially perpendicular to the first and second tube portions 90, 92 and extends between the first and second tube portions 90, 92.

At step 202, the operator provides the flexible thermally conductive sheet 72 having first, second, and third sheet portions 150, 152, 154.

At step 204, the operator disposes the first and second sheet portions 150, 152 of the flexible thermally conductive sheet 72 on at least the first and second tube portions 90, 92, respectively, such that the third sheet portion 154 extends between the first and second tube portions 90, 92.

At step 206, the operator clamps the first sheet portion 150 of the flexible thermally conductive sheet 72 to the first tube portion 90 utilizing the clamping member 74.

At step 208, the operator clamps the second sheet portion 152 of the flexible thermally conductive sheet 72 to the second tube portion 92 utilizing the clamping member 80.

At step 210, the operator further clamps the first sheet portion 150 of the flexible thermally conductive sheet 72 to the first tube portion 90 utilizing the clamping member 76.

At step 212, the operator further clamps the second sheet portion 152 of the flexible thermally conductive sheet 72 to the second tube portion 92 utilizing the clamping member 82.

At step 214, the operator disposes the battery cell 30 against the third sheet portion 154 of the flexible thermally conductive sheet 72.

The battery cell assembly 10 and the method for manufacturing the cooling fin 40 provide a substantial advantage over other battery cell assemblies and methods. In particular, the battery cell assembly 10 and the method provide a technical effect of utilizing a cooling fin 40 with a flexible thermally conductive sheet 72 to extract heat energy from battery cells.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
   a cooling fin having a tube and a flexible thermally conductive graphite sheet disposed on the tube;
   the tube having first, second, and third tube portions fluidly communicating with one another, the first and second tube portions being substantially parallel to one another, the third tube portion being substantially perpendicular to the first and second tube portions and extending between the first and second tube portions;
   the flexible thermally conductive graphite sheet having first, second, and third sheet portions; the flexible thermally conductive graphite sheet further having a first side and a second side; the third sheet portion being coupled to and extending between the first and second sheet portions, the first and second tube portions being disposed on the first and second sheet portions, respectively, on the first side of the flexible thermally conductive graphite sheet;
   a first plastic C-shaped clamping member contacting the first tube portion and the first sheet portion on the second side of the flexible thermally conductive graphite sheet to clamp the first sheet portion to the first tube portion, a length of the first plastic C-shaped clamping member being less than one-fifth of a length of the first tube portion;
   a second plastic C-shaped clamping member contacting the first tube portion and the first sheet portion on the second side of the flexible thermally conductive graphite sheet to further clamp the first sheet portion to the first tube portion, the second plastic C-shaped clamping member being separated from and disposed away from the first plastic C-shaped clamping member a first distance, a length of the second plastic C-shaped clamping member being substantially equal to the length of the first plastic C-shaped clamping member;
   a third plastic C-shaped clamping member contacting the second tube portion and the second sheet portion on the second side of the flexible thermally conductive graphite sheet to clamp the second sheet portion to the second tube portion, a length of the third plastic C-shaped clamping member being less than one-fifth of a length of the second tube portion;
   a fourth plastic C-shaped clamping member contacting the second tube portion and the second sheet portion on the second side of the flexible thermally conductive graphite sheet to further clamp the second sheet portion to the second tube portion, the fourth plastic C-shaped clamping member being separated from and disposed away from the third plastic C-shaped clamping member a second distance, a length of the fourth plastic C-shaped clamping member being substantially equal to the length of the third plastic C-shaped clamping member;
   a battery cell disposed against the third sheet portion of the flexible thermally conductive graphite sheet; and
   first and second frame members being coupled together that hold the cooling tin and the battery cell therebetween.

2. The battery cell assembly of claim 1, wherein a diameter of the first plastic C-shaped clamping member is substantially equal to a diameter of the tube.

3. The battery cell assembly of claim 1, wherein the flexible thermally conductive sheet is configured to transfer heat energy from the battery cell to the tube.

4. The battery cell assembly of claim 3, wherein the tube is configured to transfer at least a portion of the heat energy to a liquid or a refrigerant flowing through the tube.

5. The battery cell assembly of claim 1, wherein the tube is an aluminum tube.

6. The battery cell assembly of claim 1, wherein the first sheet portion is sized to cover substantially an entire generally rectangular-shaped side surface of the battery cell.

7. The battery cell assembly of claim 1, wherein the flexible thermally conductive sheet has a roughness average in a range of 0.8-4.0 micro-inches.

8. The battery cell assembly of claim 1, further comprising fourth and fifth tube portions extending from the first and second tube portions, respectively, the fourth and fifth tube portions being substantially perpendicular to the first and second tube portions, respectively.

9. The battery cell assembly of claim 8, further comprising sixth and seventh tube portions extending from the fourth and fifth tube portions, respectively, the sixth and seventh tube portions being substantially perpendicular to the fourth and fifth tube portions, respectively.

10. A method for manufacturing a cooling fin of a battery cell assembly, comprising:
    providing a cooling fin having a tube; the tube having first, second, and third tube portions fluidly communicating with one another, the first and second tube portions being substantially parallel to one another, the third tube portion being substantially perpendicular to the first and second tube portions and extending between the first and second tube portions;
    providing a flexible thermally conductive sheet having first, second, and third sheet portions, the flexible thermally conductive sheet further having a first side and a second side; the third sheet portion being coupled to and extending between the first and second sheet portions;
    disposing the first and second tube portions on the first and second sheet portions, respectively, of the flexible thermally conductive sheet on the first side of the flexible thermally conductive sheet;
    clamping the first sheet portion of the flexible thermally conductive sheet to the first tube portion utilizing a first and second C-shaped plastic clamping members such that the first and second C-shaped plastic clamping members contact the first tube portion and the first sheet portion on the second side of the flexible thermally conductive sheet, the first C-shaped plastic clamping member being separated from and disposed away from the second C-shaped plastic clamping member a first distance, a longitudinal length of the first C-shaped plastic clamping member being less than one-fifth of a length of the first tube portion;

clamping the second sheet portion of the flexible thermally conductive sheet to the second tube portion utilizing third and fourth C-shaped plastic clamping members such that the third and fourth C-shaped plastic clamping members contact the second tube portion and the second sheet portion on the second side of the flexible thermally conductive sheet, the third C-shaped plastic clamping member being separated from and disposed away from the fourth C-shaped plastic clamping member a second distance, a longitudinal length of the third C-shaped plastic clamping member being less than one-fifth of a length of the second tube portion; and disposing a battery cell against the third sheet portion of the flexible thermally conductive sheet; and coupling first and second frame members together such that the cooling fin and the battery cell are held between the first and second frame members.

11. The method of claim 10, wherein a diameter of the first C-shaped plastic clamping member is substantially equal to a diameter of tube.

12. A battery cell assembly, comprising:
a cooling fin having a tube and a flexible thermally conductive sheet disposed on the tube;
the tube having first, second, and third tube portions fluidly communicating with one another, the first and second tube portions being substantially parallel to one another, the third tube portion being substantially perpendicular to the first and second tube portions and extending between the first and second tube portions;
the flexible thermally conductive sheet having first, second, and third sheet portions; the flexible thermally conductive sheet further having a first side and a second side; the third sheet portion being coupled to and extending between the first and second sheet portions, the first and second tube portions being disposed on the first and second sheet portions, respectively, on the first side of the flexible thermally conductive sheet;
a first C-shaped clamping member contacting the first tube portion and the first sheet portion on the second side of the flexible thermally conductive sheet to clamp the first sheet portion to the first tube portion, a length of the first C-shaped clamping member being less than one-fifth of a length of the first tube portion;
a second C-shaped clamping member contacting the first tube portion and the first sheet portion on the second side of the flexible thermally conductive sheet to further clamp the first sheet portion to the first tube portion, the second C-shaped clamping member being separated from and disposed away from the first C-shaped clamping member a first distance, a length of the second C-shaped clamping member being substantially equal to the length of the first C-shaped clamping member,
a third C-shaped clamping member contacting the second tube portion and the second sheet portion on the second side of the flexible thermally conductive sheet to clamp the second sheet portion to the second tube portion, a length of the third C-shaped clamping member being less than one-fifth of a length of the second tube portion;
a fourth C-shaped clamping member contacting the second tube portion and the second sheet portion on the second side of the flexible thermally conductive sheet to further clamp the second sheet portion to the second tube portion, the fourth C-shaped clamping member being separated from and disposed away from the third C-shaped clamping member a second distance, a length of the fourth C-shaped clamping member being substantially equal to the length of the third C-shaped clamping member; and
a battery cell disposed against the third sheet portion of the flexible thermally conductive sheet.

13. The battery cell assembly of claim 12, wherein the flexible thermally conductive sheet is a flexible thermally conductive graphite sheet, the first sheet portion is a first arcuate-shaped sheet portion that receives the first tube portion thereon, and the second sheet portion is a second arcuate-shaped sheet portion that receives the second tube portion thereon.

14. The battery cell assembly of claim 12, further comprising first and second rectangular ring-shaped frame members being coupled together that hold the cooling fin and the battery cell therebetween.

* * * * *